United States Patent [19]

Choi

[11] Patent Number: 5,153,727
[45] Date of Patent: Oct. 6, 1992

[54] VIDEO SIGNAL PROCESSING APPARATUS WITH REDUCED NOISE SENSITIVITY FOR LOW ILLUMINATION AND CONTOUR COMPENSATION CONTROL FOR HIGH ILLUMINATION

[75] Inventor: Wan-Sung Choi, Suwon, Rep. of Korea

[73] Assignee: Samsung Electronic Co., Ltd., Suwon, Rep. of Korea

[21] Appl. No.: 633,385

[22] Filed: Dec. 31, 1990

[30] Foreign Application Priority Data

Dec. 30, 1989 [KR] Rep. of Korea .................. 89-21295

[51] Int. Cl.$^5$ ....................... H04N 5/208; H04N 5/14
[52] U.S. Cl. .................................... 358/162; 358/166
[58] Field of Search ............... 358/162, 166, 37, 167, 358/36, 96

[56] References Cited

U.S. PATENT DOCUMENTS

| | | | |
|---|---|---|---|
| 3,562,424 | 2/1971 | Legler | 358/162 |
| 4,541,014 | 9/1985 | Yagi | 358/166 |
| 4,654,709 | 3/1987 | Umezawa | 358/166 |
| 4,979,043 | 12/1990 | Suzuki et al. | 358/167 |
| 4,991,021 | 2/1991 | Nikoh et al. | 358/162 |

FOREIGN PATENT DOCUMENTS 58-007980 1/1983 Japan ................................... 358/162
60-102064 6/1985 Japan ................................... 358/162

OTHER PUBLICATIONS

"A Vertical Aperture Equalizer for Television", by Gibson et al., Journal of the Society of Motion Picture and Television Engineers, vol. 69, No. 6, Jun. 1960, pp. 395–401.

*Primary Examiner*—James J. Groody
*Assistant Examiner*—Safet Metjahic
*Attorney, Agent, or Firm*—Cushman, Darby & Cushman

[57] ABSTRACT

An improved video signal processing circuit employs a control signal generating device, first and second delay circuits, a signal selection circuit, an addition circuit, a subtraction circuit, and an addition/subtraction circuit. The signal selection circuit is responsive to switch control signals from the control signal generating device for selecting a first signal path when providing signal contour compensation or a second signal path when functioning as a sensitivity enhancement device. At the final output terminal of the present circuit is produced a contour-compensated luminance signal under medium or high illumination selection control and an enlarged luminance signal without noise under low illumination selection control. Mode change is a function of and dependent on the amount of incident light to be automatically achieved by the control signal generating device.

8 Claims, 3 Drawing Sheets

VIDEO SIGNAL PROCESSING APPARATUS WITH REDUCED NOISE SENSITIVITY FOR LOW ILLUMINATION AND CONTOUR COMPENSATION CONTROL FOR HIGH ILLUMINATION

BACKGROUND OF THE INVENTION

1. Field of the Invention

The present invention relates to a video signal processing circuit, and more specifically to a video signal processing circuit which enables the reduction of noise and the enlargement of a luminance signal level so as to improve the sensitivity of a video camera that is utilized in a low-illuminating or dark site.

2. Background Information

The sensitivity of a video camera is generally dependent upon the opening degree of a lens iris and the amount of light reflected from the subject into the camera. Although the camera works with reflected light, it has become traditional in TV operations to use incident light, the illumination falling on the subject. The test of the sensitivity of the video camera necessitates a standard test patter, called "Gray Scale", which defines the brightness of white color through black color into eleven stages.

The sensitivity of the video camera, however, will be lowered when the video camera is utilized in a dark site, and will affect the performance of the resultant screen badly. Thus, there has been provided a conventional technology which increases the amplification ratio for the low-level luminance signal by wasy of an auto gain controller which provides a luminance signal of a certain raised level. But, because the auto gain controller has a low threshold relative to the amplification ratio which does not cause any noise, when incident light below a predetermined light intensity corresponding to this low threshold is inputted to the video camera, undesired noise is mixed into the video signal outputted from the video camera so that it is still insufficient to obtain good video signal from low-level incident light by utilizing only the auto gain controller.

Further, a contour compensating apparatus, which will be described in detail later in reference to the accompanied drawing of FIG. 1, has been often accommodated into the video camera to increase the sharpness of the image. The contour compensating apparatus consists of two delay lines and three adders so that it may emphasize or compensate the contours of the video input signal, of which luminance level has been in the normal operation range of the auto gain controller, for example, medium or high luminance level. However, because such a device provides low signal-to-noise ratio (S/N) relative to incident light under low illuminations, the sensitivity for the low incident light will be naturally worse.

SUMMARY OF THE INVENTION

A primary object of the present invention is to provide a video signal processing circuit which accomplishes selectively contour compensation of the video signal under medium or high illumination, and sensitivity enhancement of the video signal under low illumination in response to a luminance signal level within the video signal.

Another object of the present invention is to provide a video signal processing circuit which enables selection and switching between contour compensation and sensitivity enhancement automatically.

In accordance with the present invention, there is provided a video processor circuit which comprises control signal generating means for generating switch control signals based on the magnitude of the inputted luminance signal, and signal selecting means responsive to switch control signals supplied by said control signal generating means for selecting a first signal path for contour compensation or a second signal path for sensitivity enhancement, said signal selecting means having first through fourth switch units. These switch units may be constructed by analog switches. The first signal path is selected for the purpose of the contour compensation of the video signal under medium or high illumination, while the second path provided for sensitivity enhancement is selected under low illumination.

Under medium or high illumination, the first switch unit selects the inputted original luminance signal and supplies it to the input terminals of a first and a second delay means connected in series. These delay means may respectively produce 1H (horizontal line) delayed outputs in response to their own input signals. Therefore, relative to the inputted original luminance signal, the first delay means produces one 1H delayed output and the second delay means produces a first 2H delayed output and a second 2H delayed output. The second 2H delayed output may be determined to have a level as that of the first 2H delayed output or a level smaller than that of the first 2H delayed output. The fourth switch unit operates to select the first 2H delayed output from the second delay means as an input of a first arithmetic means. The first arithmetic means accomplishes the addition operation of the inputted luminance signal (referred to as OH) plus the first 2H delayed output (referred to as 2H), and produces first and second sum outputs. The second sum output may be determined to have a value smaller than that of the first sum output. Subsequently, the second switch unit operates to select the second sum output from the first arithmetic means, for example, (OH+2H)/2 into an input of a second arithmetic means. A second arithmetic means accomplishes a subtraction operation of the 1H delayed output from the first delay means (referred to as 1H) minus the second sum output from the first arithmetic means, and produces a resultant contour compensating signal, that is 1H−[(OH+2H/2]. The contour compensating signal is transferred by a third switch unit to an input of a third arithmetic means. Finally, the third arithmetic means accomplishes the addition operation of the contour compensating signal from the third switch unit with the 1H delayed output of the first delay means which is applied to another input of said third arithmetic means, and thereby produces a luminance signal of which the contour is compensated.

Meanwhile, under low illumination, all of the switch units within the signal selecting means operate to select a signal path for improving the sensitivity of a low luminance signal in response to the switch control signal supplied by the control signal generating means. In accordance with the present invention, the sensitivity enhancement process includes three steps: enlargement of a low luminance signal level, noise detection along the enlarged luminance signal and elimination of detested noise from the enlarged luminance signal. First, the first switch unit is operative in response to the switch control signal and is laid in a state for selecting the first sum output from the first arithmetic means.

Here, the original luminance signal OH is applied to the first input terminal of the first arithmetic means, and the second 2H delayed output from the second delay means, for example, 2H/2 is applied to the second input terminal of the first arithmetic means by means of the selection of a fourth switch unit. Thus, the first arithmetic means can, at least, produce the enlarged luminance signal (referred to as OH') corresponding to OH+2H/2 through the first sum output terminal thereof.

The enlarged luminance signal from the first sum output terminal is transferred via the first switch unit to the first and the second delay means in turn so that two delay means will respectively produce their own delayed outputs of which the respective magnitudes have been enlarged. Assuming that the one delayed output of the first delay means, and the first and the second delayed outputs of the second delay means are respectively 1H', 2H', and 2H'/2, the second arithmetic means will accomplish subtraction operations of 1H'−2H' and detect noise along such adjacent luminance signals, on the premise that adjacent luminance signals are likely to have similar information. In more detail, the second switch unit selects the first delayed output 2H' from the second delay means and supplies it to one input terminal of the second arithmetic means, and thereby the second arithmetic means can detect noise by subtracting the above 2H' delayed signal from the 1H' delay signal being inputted to another input terminal thereof.

Subsequently, the third switch unit switches over the detected noise signal supplied by the second arithmetic means toward a third input terminal of a third arithmetic means. As a result, the third arithmetic means will subtract the noise signal from the 1H' delayed signal received by the first input terminal thereof so that it may produce a final luminance signal having an enlarged magnitude and no noise.

Therefore, according to the present invention, the signal-to-noise ratio for a luminance signal under low illumination is improved as well. Similarly, contour compensation for a luminance signal under medium or high illumination may be realized in the same configurations and the functional diversity would make the circuits parts or elements more valuable. Moreover, automatic selection between a S/N improving function and a contour compensating function provides a convenience for the user.

BRIEF DESCRIPTION OF THE DRAWINGS

The novel features which are believed to be characteristic of the present invention, together with further objectives and advantages thereof, will be better understood from the following description in conjunction with the accompanying drawings. The drawings illustrate the presently preferred embodiments of the present invention by way of example. It is to be understood, however, that the drawings are intended only for illustration and description and are not intended as a delineation of the limits of the present invention.

DETAILED DESCRIPTION OF THE PREFERRED EMBODIMENT

Figure 1:
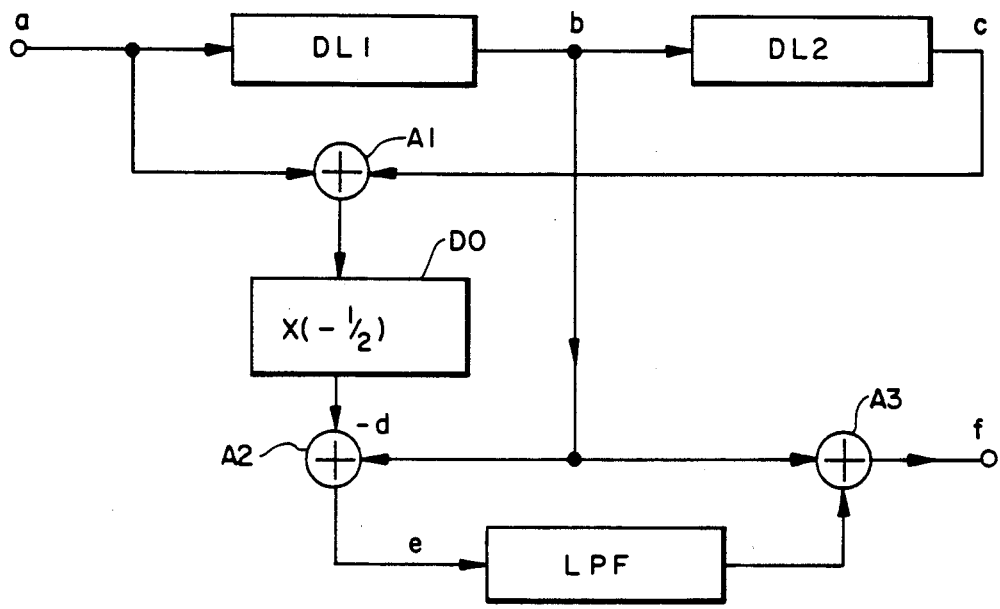
FIG. 1 is a block diagram of a contour compensating circuit in accordance with a conventional technology.
Figure 2:
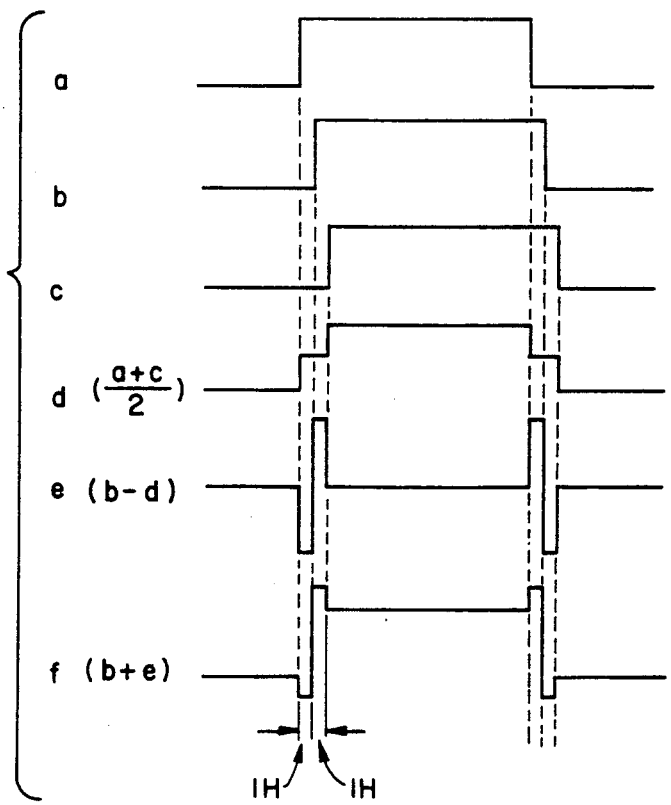
FIG. 2 is a timing diagram illustrating input and/or output signals of the circuit parts shown in FIG. 1.

Referring now to FIG. 1, there is shown a contour compensating circuit in accordance with a conventional technology. FIG. 2 is a timing diagram for explaining the operations of all the parts in FIG. 1. When luminance signal output "a" is passed through a first and a second delay lines DL1 and DL2 in turn, the two delay lines, each providing a 1H delay time, produce output signals 'b' and 'c' as shown in FIG. 2 at their own output terminals. Adder A1 is operative to add the original luminance signal input 'a' and 2H delayed luminance signal 'c' and supply a sum output of 'a+c'. Inverting amplifier DO divides the magnitude of the sum output of the adder A1 into halves to obtain signal 'd' as shown in FIG. 2, and thereafter inverts the polarity of the signal 'd' to produce an output '−d'. Adder A2 may produce a contour compensating signal 'e' as shown in FIG. 2 by adding the 1H delayed signal 'b' and the output '−d' of the inverting amplifier DO. The contour compensating signal 'e' is applied via a low pass filter LPF to one input terminal of an adder A3. The adder A3 receives 1H delayed signal 'b' through another input terminal thereof, and thus produces the luminance signal output compensated in its contour by adding the 1H delayed signal 'b' and the contour compensating signal 'e'.

The contour compensating circuit of FIG. 1, as described above, has been estimated to achieve contour compensation well in response to a luminance signal under medium or high illumination, however, a problem arises, namely small signal-to-noise ratio response to a luminance signal under low illumination.

Figure 3:
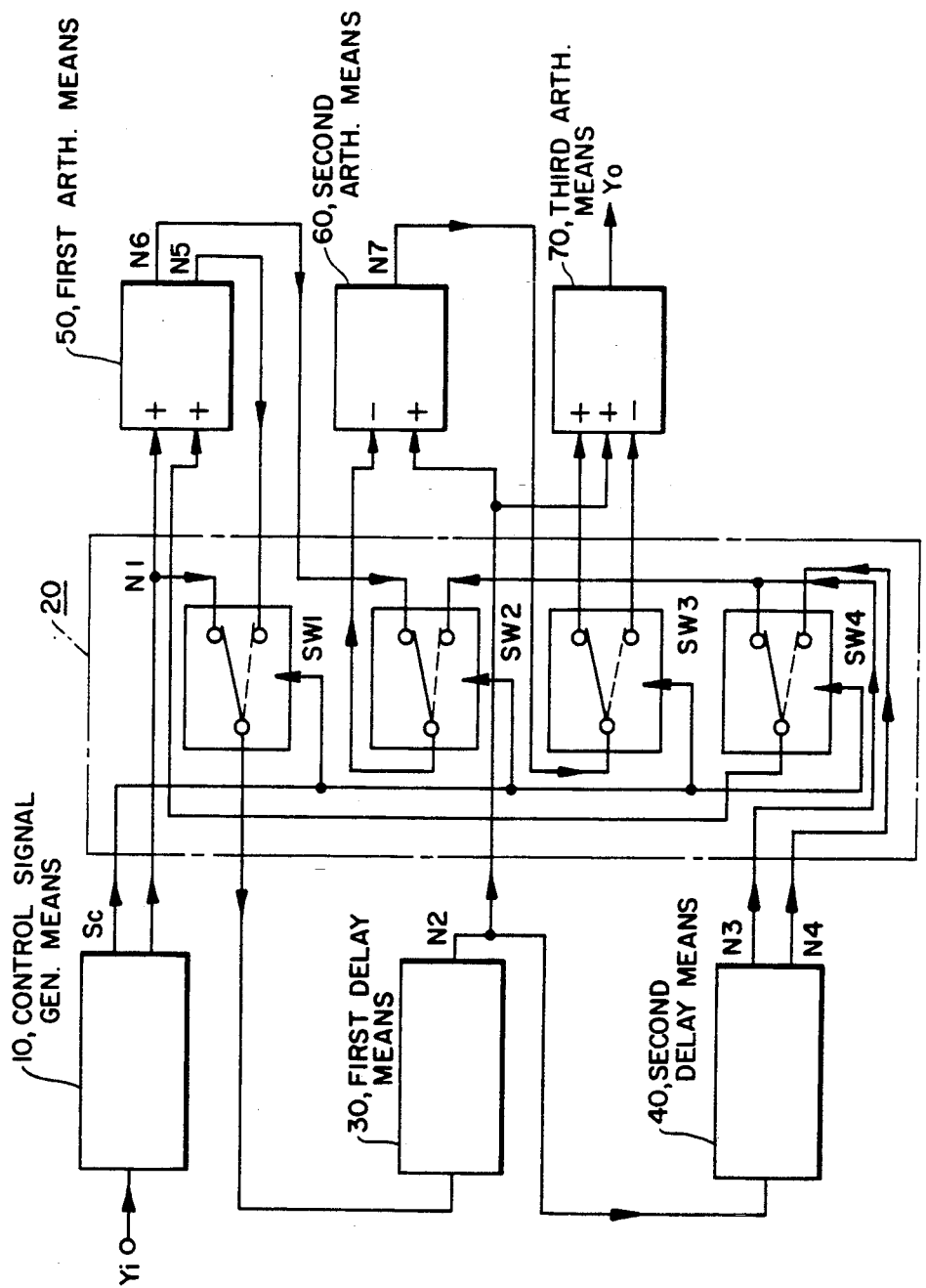
FIG. 3 is a block diagram of a preferred embodiment of the present invention.
Figure 4:
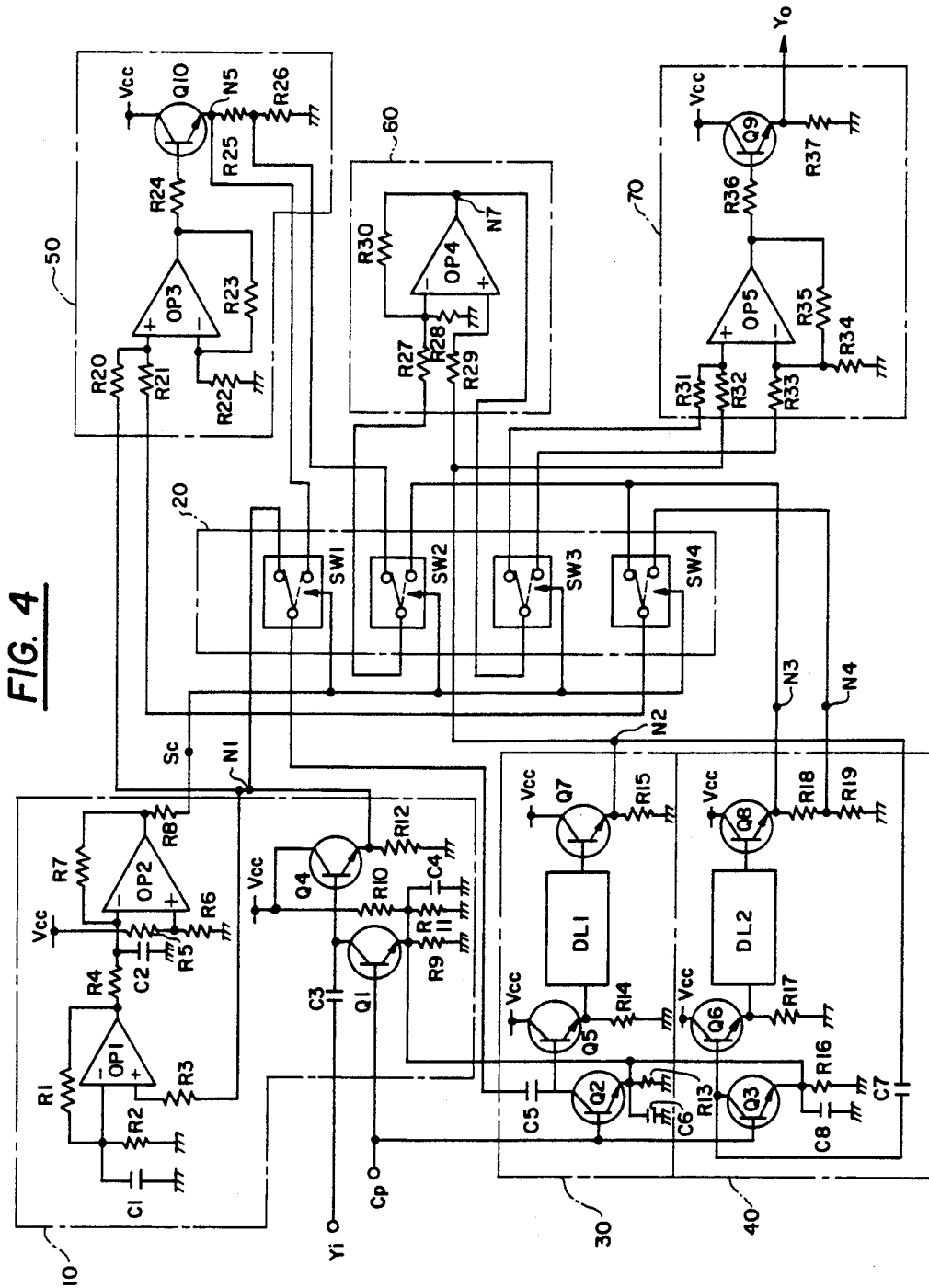
FIG. 4 is a specific detailed circuit diagram of the embodiment in FIG. 3.

FIG. 3 is a block diagram illustrating a schematic construction of a preferred embodiment according to the present invention, and FIG. 4 is a detailed circuit diagram of the preferred embodiment shown in FIG. 3.

In FIG. 3 and FIG. 4, reference numeral 10 represents control signal generating means for generating switch control signal Sc based on the level of the inputted luminance signal Yi. In one embodiment of the present invention, control signal generating means 10 comprises a first clamp circuit for clamping the inputted luminance signal Yi onto a predetermined dc level, a first buffer for buffering the output of said first clamp circuit, a noninverting amplifier for amplifying the output of said first buffer, and a comparator for comparing the output of said noninverting amplifier with a predetermined reference voltage for operation mode switching.

The first clamp circuit in FIG. 4 includes clamping condenser C3, switching transistor Q1 and clamping voltage generator Vcc, R9, C4, R10, R11. The luminance signal input Yi is applied via clamping condenser C3 to collect of switching transistor Q1, and to the base of switching transistor Q1 is applied clamping pulse Cp. The clamping pulse may be generated by a known clamping pulse generator (not shown) during the blank period in response to a horizontal synchronization signal within the video signal, and operates to turn on or off switching transistor Q1. To supply clamping voltage onto the emitter of the transistor Q1, resistor R9 and condenser C4, as well as the connecting node of resistors R10 and R11, are coupled to the emitter of transistor Q1, In athe first clamp circuit as constructed hereinbefore, during the period the clamping pulse Cp is being applied to the base of transistor Q1 a clamping voltage is supplied through the turned-on transistor Q1 onto the output side of the condenser C3 to charge condenser C3. On the other hand, during the period the clamping pulse Cp is absent, that is, when the transistor Q1 is turned off, dc voltage charged in condenser C3 is discharged in a time constant determined by condenser C3 and emitter resistor R12 within the following first buffer and remains on a certain level. By doing so, the horizontal synchronization pulse of the luminance signal Yi will have a bottom level clamped onto the output voltage of the clamp voltage generator, thus collector of transistor Q1 can produce a luminance signal containing the recovered dc voltage.

The first buffer comprises an emitter follower which is made of a transistor Q4 and an emitter resistor R12. The base of transistor Q4 is connected to the collector of transistor Q1. The emitter of transistor Q4 provides the output of the first buffer. The first buffer has high output impedance but converts its input signal into an output signal of low impedance without any change to the dc clamped level.

A noninverting amplifier connected to the output terminal of the first buffer, functions to amplify the output of the first buffer and provide its output of the same polarity as that of the first buffer's output. In the embodiment of FIG. 4, the noninverting amplifier comprises an operational amplifier OP1, resistors R1, R2, and condenser C3. The output of the noninverting amplifier is transferred to one input terminal of a comparator by way of a low pass filter constructed with resistor R4 and condenser C2.

The comparator, in the present embodiment, comprises an operational amplifier OP2, resistors R5, R6 for determining a reference voltage, a feedback resistor R7, and output resistor R8. The reference voltage applied onto a noninverting input terminal of the operational amplifier OP2 becomes the reference for switching the operation mode of the video signal processing circuit of the present invention, and derives from a certain threshold between low illumination and medium illumination (herein referred to as a predetermined reference illumination level). Accordingly, when the level of the luminance signal input applied to the inverting input terminal of operational amplifier OP2 is larger than the reference voltage, that is, when a luminance signal under medium or high illumination is applied as the input Yi, the comparator produces switch control signal Sc of low logic level. On the contrary, when the level of the luminance signal input is smaller than the reference voltage, that is, when a luminance signal under low illumination is applied as the input Yi, the comparator produces switch control signal Sc of high logic level.

In another embodiment of the present invention, control signal generating means may be constructed with a manual switch, which is arbitrarily adjusted by a user dependent on the user's decision about the illumination condition.

Signal selecting means comprises four switch units SW1 through SW4. In one embodiment, the respective switch units may be made by analog switches. Depending on the high or low level switch control signal, the switch units are adapted to select a signal path under medium or high illumination (shown as a solid line) or a signal path under low illumination (shown as a dotted line).

First delay means represented by reference numeral 30 delays the output of first switch unit SW1 by 1H and produces one delayed output through an output node N2. Second delay means represented by reference numeral 40 delays the output of the first delay means 30 by 1H and produces first and second delay outputs respectively through first and second output nodes N3 and N4.

First delay means 30 according to one embodiment of the present invention comprises a second clamp circuit for clamping the output of the first switch unit SW1 onto a predetermined dc level, a second buffer for buffering the output of the second clamp circuit, a first delay line DL1 for delaying the output of the second buffer by 1H, and a third buffer for buffering the output of the first delay line. The second clamp circuit, as shown in FIG. 4, includes clamping condenser C5, switching transistor Q2, and condenser C6 and resistor R13 for generating a clamping voltage. The interconnections between them is made in the same way as that of the first clamp circuit in control signal generating means 10. But, it is noted that the input side of the clamping condenser C5 is coupled to the output terminal of first switch unit SW1. Further, the interconnecting configurations of the transistor and emitter resistor pairs (Q5 and R14), (Q7 and R15), each constituting the second and the third buffers respectively, is the same as that of the first buffer.

Second delay means 40 according to one embodiment of the present invention comprises a third clamp circuit for clamping the output N2 of the first delay means 30 onto a predetermined dc level, a fourth buffer for buffering the output of the third clamp circuit, a second delay line DL2 for delaying the output of the fourth buffer by 1H, a fifth buffer for buffering the output of the second delay line and providing the first delayed output N3 of the second delay means 40, and a voltage divider for dividing the first delayed output N3 from the fifth buffer and providing the second delayed output N1 of the second delay means.

The third clamp circuit, which includes clamping condenser C7, switching transistor Q3, and condenser C8 and resistor R16 for generating a clamping voltage, has the same configuration as that of the above-mentioned second clamp circuit. Transistor and emitter resistor pairs (Q6 and R17), (Q8 and a composite of R18 and R19), which are respectively positioned as the input and output stages of second delay line DL2, form the fourth and fifth buffers respectively. However, second delay means 40 has a specific construction as follows. That is, the emitter of the transistor Q8 is defined as the first delayed output terminal N3 of the second delay means 40, while the second delayed output terminal N4 of the second delay means 40 is found at the intermediate tab of the voltage divider R18 and R19. If the voltage divider is made by a variable resister, a signal level of the second delayed output N4 may be the same as or the smaller than that of the first delayed output N3. In the present embodiment, the level of N4 is preferably determined to become half of the level of N3. Meanwhile, the foregoing clamping pulse Cp is commonly applied to each base of transistors Q2 and Q3 for the purpose of the synchronization of the first through the third clamp circuits. Furthermore, in order to simplify the construction of clamping voltage generator for supplying the clamping voltage to emitters of switching transistors Q2 and Q3, the respective emitters of switching transistors Q2 and Q3, together with the emitter of switching transistor Q1, are coupled to the interconnecting node of resistors R10 and R11.

First arithmetic means 50 shown in the drawings accomplishes the addition operation of the output of fourth switch unit SW4 plus the luminance signal inputted through the output terminal N1 of the first buffer and produces first and second sum outputs N5 and N6. In one embodiment, the first arithmetic means 50 comprises an adder circuit for adding clamped luminance signal N1 and the output of fourth switch unit SW4, a sixth buffer for buffering the output of the adder circuit and providing the first sum output N5 of first arithmetic means 50, and a voltage divider R25 and R26 for dividing the first sum output N5 of the sixth buffer and providing the second sum output N6 of said first arithmetic means 50.

In the specific configuration in FIG. 4, the adder circuit includes an operational amplifier OP3 and resistors R20 through R24. Here, the luminance signal N1 is applied through the resistor R20 to the noninverting input terminal of the operational amplifier OP3 and the output of the fourth switch unit SW4 is also applied through the resistor R21 to the noninverting input terminal of operational amplifier OP3 so that the amplifier OP3 may produce the sum outputs of both input signals. However, since fourth switch unit SW4 will select alternatively the first delayed output N3 of second delay means 40 in the case when switch control signal Sc is low level (i.e., in medium or high illumination), and the second delayed output N4 of second delay means 40 in the case when switch control signal Sc is high level (i.e., in low illumination), amplifier OP3 will have a different output dependent on the level of the switch control signal Sc.

Transistor Q10 forming the sixth buffer within the first arithmetic means 50 provides, at the emitter thereof, the first sum output N5 of said first arithmetic means, while the voltage divider R25 and R26 provides, at the intermediate tab, the second sum output N6 of said first arithmetic means. In the case where the voltage divider is a variable resistor, level N5 can be set the same or smaller than the level N6. In one embodiment of the present invention, the level N6 becomes half the level of N5.

First switch unit SW1 within said signal selecting means 20 is equipped with a first input terminal for receiving the luminance signal supplied through the output node N1 of said first buffer, and a second input terminal for receiving the second sum output N5 of first arithmetic means 50. Therefore, dependent on the level of switch control signal Sc, first switch unit SW1 can selectively provide two different signals at its output terminal. One is the first input terminal signal thereof in the case where signal Sc is low level (i.e., in medium or high illumination), and the other is the second input terminal signal thereof in where signal Sc is high level (i.e., in low illumination).

Second switch unit SW2 is equipped with a first input terminal for receiving the second sum output N6 from said first arithmetic means 50, and a second input terminal for receiving the second delayed output N4 of said second delay means 40, and thereby produces, at its output terminal, the second sum output N6 in medium or high illumination or the second delayed output N4 in low illumination selectively.

Second arithmetic means represented by reference numeral 60 comprises a subtractor circuit for subtracting the delayed output N2 of said first delay means 30 from the output of second switch unit SW2, and thereby selectively produce a contour compensating signal when illumination is above or equal to the predetermined reference illumination level or produce a noise composition signal when illumination is below the predetermined reference illumination level, said noise composition signal being equal to a difference between neighboring luminance signals which define the vertical direction of a TV screen.

In more details, to a noninverting input terminal of an operational amplifier OP4 forming the above subtractor circuit is applied the delayed output N2 of first delay means 30 by way of resistor R29, and to an inverting input terminal of operational amplifier OP4 is applied the output of second switch unit SW2 by way of resistor R27. Further, resistor R28 is positioned between the inverting input terminal of the amplifier OP4 and ground, and resistor R30 is positioned between the inverting input terminal and the output terminal of amplifier OP4. Now, assuming that signals N1, N2 and N3 under medium or high illumination selection are respectively represented as 0H, 1H and 2H, amplifier OP3 produces the sum output of (0H+2H). Accordingly, the second sum output N6 of first arithmetic means 50 becomes ((0H+2H)/2) and is in turn forwarded via second switch unit SW2 to the inverting terminal of amplifier OP4 within second arithmetic means 60. Delayed output 1H of first delay means 30 is forwarded to the noninverting input terminal of amplifier OP4, and finally amplifier OP4 can produce the contour compensating signal of (1H−(0H+2H)/2) as shown in FIG. 2(e). Conversely, assuming that signals N1, N2 and N3 under low illumination selection are respectively represented as 0H', 1H' and 2H', amplifier OP3 produces the sum output of (0H'+2H'/2), and then this sum output is forwarded from the first sum output terminal N5 of first arithmetic means 50 through first switch unit SW1 to first delay means 30 and second delay means 40 in sequence. Therefore, it results in that the magnitude of the luminance signal applied to first and second delay means 30 and 40 is enlarged in relation to the original luminance signal 0H'.

In a way, the delayed output signal 1H' of first delay means 30 is applied to the noninverting input terminal of amplifier OP4 within second arithmetic means 60, and also first delayed output signal 2H' of second delay means 40 is applied via second switch unit SW2 to the inverting input terminal of amplifier OP4 so that amplifier OP4 may detect a noise composition signal equal to the difference of [1H'−2H'] between adjacent luminance signals.

In one embodiment, third switch unit SW3 within signal selecting means 20 has a common input terminal for receiving the output of operational amplifier OP4, and thus is adapted to switch over the contour compensating signal outputted from operational amplifier OP4 for feeding to its first output terminal thereof under medium or high illumination selection, or switch over to the detected noise composition signal similarly outputted from operational amplifier OP4 for feeding its second output terminal thereof under low illumination selection.

As a final stage, third arithmetic means 70 comprises an adder/subtractor circuit and a seventh buffer for buffering the output of the adder/subtractor circuit. The adder/subtractor circuit operates to accomplish the addition of the delayed output signal 1H of first delay means 30 and the contour compensating signal from the first output terminal of third switch unit SW3, or, conversely, the subtraction of the delayed output signal 1H' of first delay means 30 minus the detected noise composition from the second output terminal of third switch unit SW3 selectively based on the level of the foregoing switch control signal Sc. In the embodiment of FIG. 4, to a noninverting input terminal of operational amplifier OP5 forming the adder/subtractor circuit is coupled the output N2 of first delay means 30 by way of resistor R32, and also is commonly coupled the first output of third switch unit SW3 by way of a resistor R31. Further, the second output of third switch unit SW3 is coupled by way of resistor R33 to an inverting input terminal of operational amplifier OP5, and resistor R34 and resistor R35 are respectively positioned between the inverting input terminal of operational amplifier OP5 and ground, and between the inverting input terminal of operational amplifier OP5 and the output terminal thereof. The output terminal of amplifier OP5 is coupled via resistor R36 to the base of transistor Q9 and forming the seventh buffer. The output of third arithmetic means 70 is picked out from the emitter of transistor Q9. According to the adder/subtractor circuit having the foregoing configurations, since both the delayed output signal 1H from first delay means 30 and the contour compensating signal from the first output terminal of third switch unit SW3 are simultaneously applied only to the noninverting input terminal of operational amplifier OP5 under medium or high illumination selection, amplifier OP5 can substantially accomplish the addition of (1H+contour compensating signal) to produce the contour compensated luminance signal as shown in FIG. 2 (f) through the final output terminal Yo.

On the other hand, since the delayed output signal 1H from first delay means 30 and the detected noise composition signal from the second output terminal of third switch unit SW3 are respectively applied to the noninverting input terminal and the inverting input terminal of amplifier OP5 under low illumination selection, amplifier OP5 can now accomplish the subtraction of (1H'-detected noise composition signal) to produce a resultant luminance signal through the same output terminal Yo, which signal level is effectively enlarged without noise.

It is thus understood that with the present invention it is possible to provide an economic and efficient video signal processing circuit for accomplishing contour compensation under medium or high illumination selection and sensitivity enhancement under low illumination selection automatically by adopting most of the existing elements within present contour compensation type apparatuses.

The foregoing description is the best presently contemplated mode of realizing the present invention. This description is not to be taken in a limiting sense, but is made merely for the purpose of illustrating the general principles of the present invention. The scope of the invention is best determined by reference to the appended claims.

I claim:

1. A video signal processing circuit comprising:
control signal generating means for generating a switch control signal in response to an input luminance signal:
signal selecting means comprising first through fourth switch units, each switch unit being selectively switched in response to said switch control signal from said control signal generating means;
first arithmetic means for adding the input luminance signal and an output of the fourth switch unit and generating first and second sum outputs, said first switch unit selectively providing one of the input luminance signal and the first sum output to a first switch unit output terminal thereof in response to the switch control signal;
first delay means for delaying an output signal from the output terminal of said first switch unit by 1H to provide a one delay output;
second delay means for delaying the one delay output from said first delay means by 1H to provide first and second delay outputs, said fourth switch unit selectively providing one of said first and second delay outputs to a fourth switch unit output terminal thereof in response to the switch control signal, said second switch unit selectively providing one of the second sum output from said first arithmetic means and the second delay output to a second switch unit output terminal thereof in response to the switch control signal;
second arithmetic means for subtracting the one delay output from an output signal of the said second switch unit output terminal and generating a subtraction output in response thereto, wherein said subtraction output is a contour compensating signal when an illumination level of said input luminance signal is above or equal to a predetermined reference illumination level, and said first subtraction output is a detected noise composition signal when an illumination level of said input luminance signal is below the predetermined reference illumination level, said third switch unit selectively providing said subtraction output to one of first and second output terminal thereof in response to the switch control signal;
third arithmetic means for selectively performing either an addition function of the one delay output and an output signal from the first output terminal of the third switch unit, or a subtraction function between the one delay output and the second output terminal of the third switch unit in response to the illumination level of the input luminance signal.

2. The video signal processing circuit of claim 1, wherein said control signal generating means comprises a first clamp circuit for clamping the input luminance signal onto a predetermined dc level, a first buffer for buffering an output of said first clamp circuit, a non-inverting amplifier for amplifying an output of said first buffer, and a comparator for comparing an output of said non-inverting amplifier with a predetermined reference voltage to generate said switch control signal.

3. The video signal processing circuit of claim 1, wherein said control signal generating means comprises a manual switch which is selectively adjustable by a user to provide said switch control signal.

4. The video signal processing circuit of claim 1, wherein said first delay means comprises a second clamp circuit for clamping the output signal from said first switch unit onto a predetermined level, a second buffer for buffering an output of said second clamp circuit, a first delay line for delaying an output of said second buffer by 1H, and a third buffer for buffering an output of said first delay line.

5. The video signal processing circuit of claim 1, wherein said second delay means comprises a third clamp circuit for clamping the output signal from said first delay means onto a predetermined dc level, a fourth buffer for buffering an output of said third clamp circuit, a second delay line for delaying an output of said fourth buffer by 1H, a fifth buffer for buffering an output of said second delay line and providing said first delay output of said second delay means, and a voltage divider for dividing said first delay output from said fifth buffer and providing said second delay output of said second delay means.

6. The video signal processing circuit of claim 1, wherein said first delay means comprises an adder circuit for adding the input luminance signal and the output signal of said fourth switch unit, a sixth buffer for buffering an output of said adder circuit and providing said first sum output of said first arithmetic means, and a voltage divider for dividing said first sum output of said sixth buffer and providing said second sum output of said first arithmetic means.

7. The video signal processing circuit of claim 1, wherein said second arithmetic means comprises a subtractor circuit for subtracting the one delay output of said first delay means from the output signal of said second switch unit, thereby selectively producing either said contour compensating signal when the illuminating level is above or equal to the predetermined reference illumination level, or said noise composition signal when the illumination level is below said predetermined reference illumination level.

8. The video signal processing circuit of claim 1, wherein said third arithmetic means comprises an adder/subtractor circuit for selectively providing either the addition function of the one delay output and the contour compensating signal corresponding to the output signal from the first output terminal of said third switch unit, or the subtraction function between the one delay output and the detected noise composition signal corresponding to the output signal from the second output terminal of said third switch unit, and a seventh buffer for buffering an output of said adder/subtractor circuit, thereby selectively producing a contour-compensated luminance signal or an enlarged luminance signal.

* * * * *